United States Patent
Grudzinski et al.

(10) Patent No.: US 8,266,841 B2
(45) Date of Patent: Sep. 18, 2012

(54) WEATHERSTRIP SYSTEM FOR AUTOMOTIVE VEHICLE DOOR

(75) Inventors: Gregory James Grudzinski, Perrysburg, OH (US); Chester Stanislaus Walawender, Livonia, MI (US); Azfar Qamar, Canton, MI (US)

(73) Assignee: Ford Global Technologies, Dearborn, MI (US)

( * ) Notice: Subject to any disclaimer, the term of this patent is extended or adjusted under 35 U.S.C. 154(b) by 282 days.

(21) Appl. No.: 12/720,779

(22) Filed: Mar. 10, 2010

(65) Prior Publication Data

US 2011/0219700 A1 Sep. 15, 2011

(51) Int. Cl.
*E06B 7/16* (2006.01)
(52) U.S. Cl. ............................. 49/377; 49/374; 49/498.1
(58) Field of Classification Search .................... 49/377, 49/374, 490.1, 498.1
See application file for complete search history.

(56) References Cited

U.S. PATENT DOCUMENTS

| | | | | |
|---|---|---|---|---|
| 4,926,600 | A * | 5/1990 | Mesnel | 49/490.1 |
| 4,976,067 | A * | 12/1990 | Maass | 49/377 |
| 5,014,464 | A * | 5/1991 | Dupuy et al. | 49/440 |
| 5,199,760 | A * | 4/1993 | Vering | 296/146.16 |
| 5,209,019 | A * | 5/1993 | Morita | 49/490.1 |
| 5,343,609 | A | 9/1994 | McManus | |
| 5,347,759 | A * | 9/1994 | Kobayashi et al. | 49/496.1 |
| 5,493,814 | A | 2/1996 | Christian | |
| 5,852,898 | A * | 12/1998 | Hikosaka et al. | 49/498.1 |
| 5,870,860 | A * | 2/1999 | Heller | 49/477.1 |
| 6,070,364 | A * | 6/2000 | Berry | 49/482.1 |
| 6,119,406 | A * | 9/2000 | Gulisano et al. | 49/502 |
| 6,141,854 | A | 11/2000 | Mueller | |
| 6,612,074 | B1 * | 9/2003 | Kaye et al. | 49/441 |
| 6,681,526 | B2 * | 1/2004 | Mueller et al. | 49/440 |
| 7,052,021 | B2 * | 5/2006 | Plottnik | 277/642 |
| 7,458,185 | B2 | 12/2008 | Imaizumi | |
| 7,484,287 | B2 | 2/2009 | Tamura | |
| 2001/0017005 | A1 * | 8/2001 | Ellis | 49/40 |
| 2001/0037606 | A1 * | 11/2001 | Iimori et al. | 49/490.1 |
| 2004/0104542 | A1 | 6/2004 | Kobayashi | |
| 2004/0200151 | A1 * | 10/2004 | Tognetti et al. | 49/377 |
| 2005/0126077 | A1 * | 6/2005 | Cittadini et al. | 49/377 |
| 2006/0168892 | A1 * | 8/2006 | Dohles et al. | 49/374 |
| 2006/0260201 | A1 * | 11/2006 | Fischer | 49/377 |
| 2007/0227073 | A1 * | 10/2007 | Tognetti et al. | 49/377 |
| 2008/0216412 | A1 * | 9/2008 | Shumulinskiy | 49/490.1 |
| 2008/0302022 | A1 * | 12/2008 | Knight et al. | 49/490.1 |
| 2009/0241430 | A1 * | 10/2009 | Knape | 49/489.1 |

FOREIGN PATENT DOCUMENTS

EP 587428 A1 3/1994
JP 2004224230 A 8/2004

* cited by examiner

*Primary Examiner* — Katherine W Mitchell
*Assistant Examiner* — Justin Rephann
(74) *Attorney, Agent, or Firm* — Jerome R. Drouillard; Greg P. Brown

(57) ABSTRACT

A weatherstrip for the outer belt of a an automotive door includes a controllably compliant sealing element configured with tip-conjoined leaves which afford controllable, selectively discontinuous compliance along not only the distance from the roots to the tip of the leaves, but also along the length of the sealing element.

4 Claims, 4 Drawing Sheets

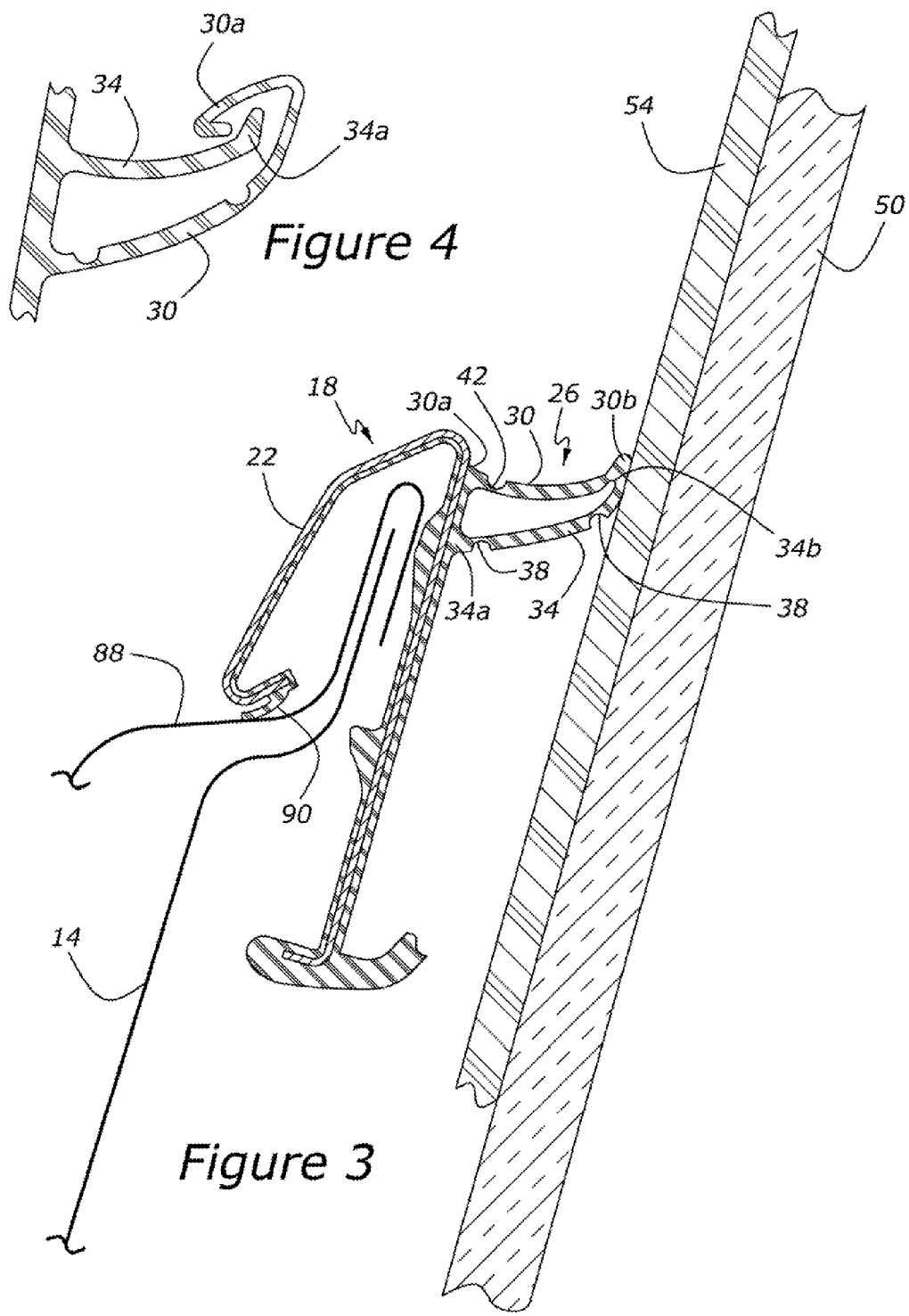

US 8,266,841 B2

WEATHERSTRIP SYSTEM FOR AUTOMOTIVE VEHICLE DOOR

TECHNICAL FIELD

This invention relates to a sealing system applied within a portion of a vehicle door, particularly at the door's beltline.

BACKGROUND

Beltline seals have been used for many years in automotive vehicle doors. Outer beltline seals are typically configured as a sealing device which contacts both a glazing panel and a trim appliqué, if any, applied to the door's frame. In order to provide a seal for the glazing panel, known sealing devices use a strip of material which projects into contact with the glass, as shown in prior art FIG. 5. Because the appliqué stands proud, or, in other words, projects outwardly from the adjacent glass surface, the sealing strip must be locally relieved, or cut away, in the area of an appliqué in order to permit the sealing strip to lie flat against the glazing panel. This is shown in prior art FIG. 6.

As a result of the need to locally relieve the sealing strip in known designs, road splash or other foreign material is permitted to flow from above the sealing strip to the interior of the door through the cut-out regions located at the appliqué, or other interfaces, as well as at the door frame (FIG. 6). This is undesirable because of the possibility of resulting particulate contamination of the door's lock mechanism, window controller and other internal structures. This loss of sealing interface also results in air leakage, road and wind noise intrusion, and NVH (noise, vibration, and harshness) degredation.

It would be desirable to provide a weatherstrip system for the beltline region of an automotive door which seals robustly to both the glazing panel and a trim appliqué or other interfaces, without providing a place for contamination to enter the interior of the door.

SUMMARY

According to an aspect of the present invention, a weatherstrip system for an automotive vehicle door includes a carrier for mounting the weatherstrip system to the door, and a controllably compliant sealing element attached to the carrier. According to another aspect of the present invention, the controllably compliant sealing element includes a first leaf cantilevered from the carrier, and a second leaf cantilevered from the carrier at a position apart from the first leaf. The first and second leaves are conjoined at their unsupported ends and have substantially constant widths. The conjoinment may result in the leaves being joined as a single piece, or as separate pieces interfacing with a labyrinth joint.

According to another aspect of the present invention, the weatherstrip system is mounted to an outer belt region of an automotive door, such that the controllably compliant sealing element contacts both a glazing panel and a trim appliqué.

According to another aspect of the present invention, the leaves of the compliant sealing element may incorporate one or more integral hinges which serve to modify the bending stiffness, or compliance, of the sealing element. More than one hinge may be employed within a single leaf.

According to another aspect of the present invention, the controllably compliant sealing element has discontinuous bending stiffness along its length, so as to accommodate the combined profile of a glazing panel and an adjacent trim appliqué. In other words, the sealing element has a higher amount of compliance in a region which contacts the trim appliqué, and a lesser amount of compliance in a region which contacts the glazing panel.

According to another aspect of the present invention, the first and second leaves of the compliant sealing element each have a root attached, or cantilevered, to the carrier, and a tip which is conjoined with the tip of an adjacent leaf. The first and second leaves have a combined deflection stiffness which is discontinuous long the length of the leaves.

It is an advantage of the present weatherstrip system that the outer beltline of a vehicle door is sealed securely in both the glazing and appliqué areas, so as to prevent the ingress of road splash and other contamination.

It is another advantage of the present weatherstrip system that excellent sealing is achieved without the need for either additional sealing parts or additional assembly operations.

It is another advantage of the present weatherstrip system that sealing of the inner surface of an automotive door glazing panel may be achieved robustly, and with reduced interior noise, vibration, and harshness.

It is another advantage of the present weatherstrip system that the finished appearance of a vehicle door is enhanced.

Other advantages, as well as features of the present invention, will become apparent to the reader of this Specification.

BRIEF DESCRIPTION OF DRAWINGS

FIG. 3 is a partial sectional view of the door of FIG. 1, taken along the line 3-3 of FIG. 1.

FIG. 4 is a sectional view a weatherstrip conjoined with a labyrinth joint.

DESCRIPTION OF INVENTION

Figure 1:
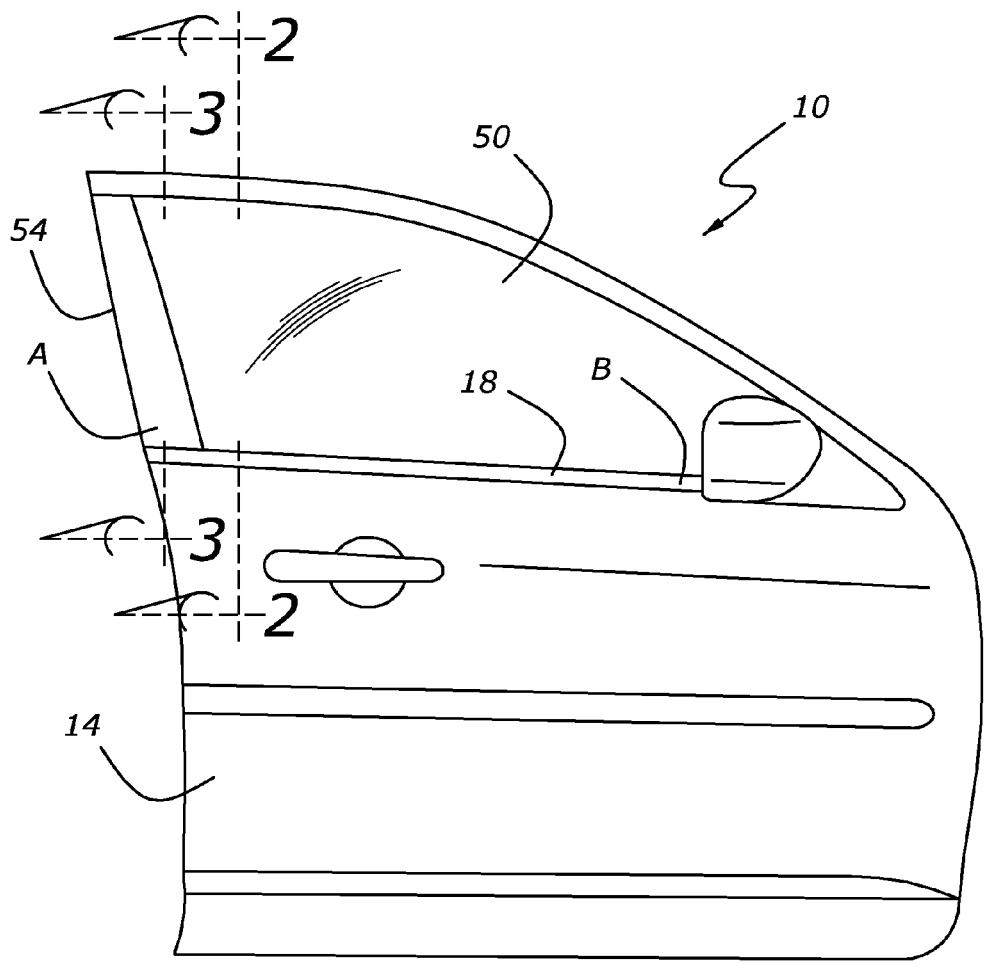
FIG. 1 is a partially schematic plan view of a vehicle door having a weatherstrip system according to the present invention.
Figure 2:
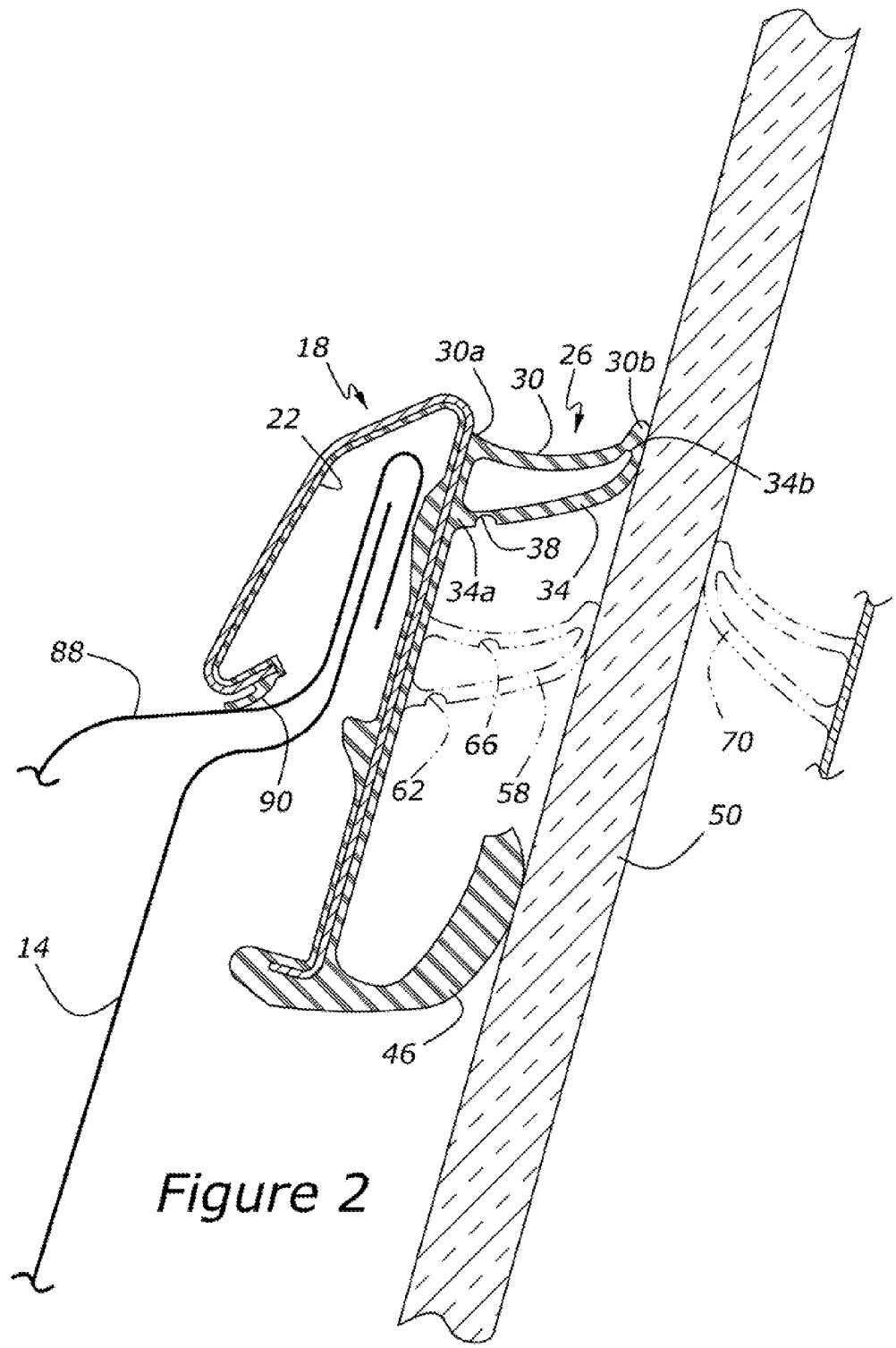
FIG. 2 is a partial sectional view of the door of FIG. 1, taken along the line 2-2 of FIG. 1.
Figure 5:
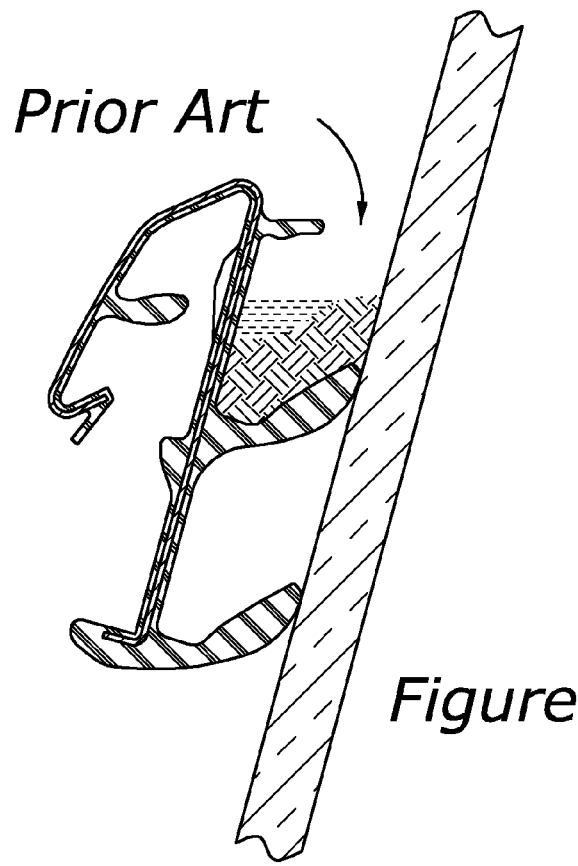
FIG. 5 is a section through an automotive door with a prior art sealing system.
Figure 6:
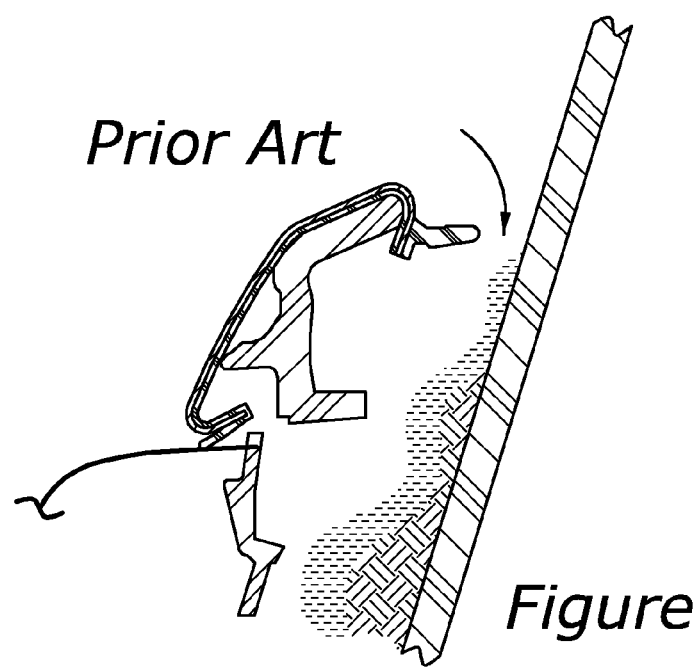
FIG. 6 is similar to FIG. 4, but shows the sealing system of FIG. 4 having been cut away in the area of a trim appliqué.

As shown in FIG. 1, a door, 10, has an outer panel, 14, to which an outer belt molding and weatherstrip system, 18, is attached. Note that weatherstrip system 18 extends across door 10 from point A to point B. Door 10 also includes a glazing panel, 50, and a trim appliqué, 54. Weatherstrip system 18 is mounted to outer panel 14 so as to sealingly engage both glazing panel 50 and trim appliqué 54, as well as other trim interfaces, as required. FIG. 2 illustrates optional weatherstrip 70, which may be provided for sealing the interior surface of glazing panel 50. Weatherstrip 70 further reduces unwanted NVH within the passenger compartment of a vehicle.

FIG. 2 illustrates weatherstrip system 18 as being mounted upon outer panel 14. In the view of FIG. 2, weatherstrip system 18 is engaging glazing panel 50 with two or more sealing elements.

These include: controllably compliant sealing element 26: optional, wishbone-shaped additional sealing element 58; and monoleaf seal 46. As used herein, the term "controllably compliant" means that the compliance, or bending stiffness, of sealing element 26 is modifiable, or tunable, to accommodate the particular geometry of an automotive door, including its interfaces, to which the inventive weatherstrip is attached. Sealing elements 26 and 55 may share a common design. As described below, this tuning is produced by providing control hinges in one or both of compliant sealing elements 26 and 58. Additional tuning is achievable by selectively changing the section thickness of the sealing element leaves.

Sealing element 26 includes a first leaf, 30, which is cantilevered from carrier 22, and which has a root, 30a, attached to carrier 22. Sealing element 26 also includes a second leaf, 34, having a root, 34a, which is also attached to carrier 22. Leaves 30 and 34 are conjoined at their unsupported ends, tips 30b and 34b. In similar fashion, wishbone shaped sealing element 58 has two leaves joined at their tips. The bulb-like configurations of sealing elements 26 and 58 produce excellent, controllable sealing and NVH control sealing element 26 of weatherstrip system 18 further includes a depending seal leg, 90, which bears upon outer portion 88 of door 10 (FIGS. 2 & 3).

Leaf 34 has a single hinge, 38, which beneficially provides a control for the compliance, or bending stiffness, of the combined structure including leaves 30 and 34. The reduced material thickness existing at hinge 38 allows leaf 34, but also, leaf 30, to conform with a contacted surface, whether it be glass panel 50 shown in FIG. 2, or trim appliqué 54 shown in FIG. 3. Moreover, controlled compliance sealing element 26, including leaves 34 and 30, has a substantially constant unloaded width, which helps to assure that weatherstrip system 18 seals at not only glazing panel 50, but also at trim appliqué 54 and at any other interfaces with trims or other door components at the periphery of glazing panel 50. Sealing element 26 may be constructed advantageously from an elastomeric material, with hinge 38 being created either during the molding of element 26, or during a secondary manufacturing operation. Moreover, leaf 30 and leaf 34 may be constructed of multiple types and durometers of material, such as EPDM, to achieve the appearance and performance desired from any particular embodiment of the present invention.

FIG. 3 shows the higher amount of compliance produced by having multiple hinges available. Leaf 30 has hinge 42, and leaf 34 has two hinges 38. In essence, the hinges allow sealing element 26 to flex sufficiently to permit sealing element 26 to contact not only trim appliqué 54, but also glazing panel 50, with sufficient force to prevent contamination from entering the interior space of door 10. And, this is true notwithstanding that monoleaf seal 46 is trimmed away substantially in the region of either trim appliqué 54 (FIG. 3), or in the region of other interfaces, such as mirrors, etc. (not shown).

It is clear from the foregoing discussion that a controllably compliant sealing element according to an aspect of the present invention includes two types of compliance or bending stiffness discontinuities. A first type of discontinuity is produced by the hinges located in the aforementioned leaves. This produces a localized change in stiffness. But, the stiffness may also be rendered discontinuous along the length of sealing element 26, such as where the compliance is increased (stiffness decreased) in the region of a trim appliqué, for example, by providing an additional hinge only in the zone of the trim appliqué or other weatherstrip interface.

FIG. 4 shows a weatherstrip according to the present invention in which leaves 30 and 34 are conjoined not as a single piece, but rather by a labyrinth joint including elements 30a and 34a. Elements 30a and 34a function as slip plane interfaces which may be treated to minimize vibrational contact noise. The embodiment of FIG. 4 provides an alternative structure for achieving excellent sealing resulting from controlled seal compliance.

Although the present invention has been described in connection with particular embodiments thereof, it is to be understood that various modifications, alterations, and adaptations may be made by those skilled in the art without departing from the scope of the invention set forth in the following claims.

The invention claimed is:

1. A weatherstrip system for an automotive vehicle door, comprising:
    a carrier for mounting the weatherstrip system to an automotive door; and
        a compliant primary sealing element attached to said carrier, with said compliant sealing element having a discontinuous bending stiffness along its length, with said compliant sealing element comprising:
    a first leaf, extending along substantially the entire length of the weatherstrip system, and having a tip and a root, with the root being cantilevered from said carrier; and
        a second leaf, co-extending with said first leaf along substantially the entire length of the weatherstrip system, and having a tip and a root, with the root being cantilevered from said carrier at a position apart from said first leaf, with said first leaf and said second leaf being conjoined at their tips, wherein said first leaf and said second leaf have a combined bending stiffness which is discontinuous along the length of said leaves, wherein said weatherstrip system is mounted to an outer belt region of an automotive door, such that the compliant sealing element contacts both a glazing panel and a trim appliqué which stands proud of said glazing panel, with said compliant sealing element having less compliance in the region of the compliant sealing element which contacts the glazing panel, and more compliance in a region of the compliant sealing element which contacts the trim appliqué, whereby the compliant sealing element will effectively seal to not only the glazing panel, but also to the trim appliqué.

2. The weatherstrip system according to claim 1, further comprising a second compliant sealing element attached to said carrier at a position apart from the primary, compliant sealing element.

3. The weatherstrip system according to claim 1, wherein said first leaf and said second leaf comprise molded elastomeric material.

4. The weatherstrip system according to claim 1, with said compliant sealing element further comprising a depending seal leg (90) bearing upon an outer portion (88) of said automotive door.

* * * * *